United States Patent [19]

Herberts

[11] Patent Number: 4,961,628

[45] Date of Patent: Oct. 9, 1990

[54] MEANS FOR OBSERVING GAS-TIGHT AND PRESSURE-TIGHT CLOSED CHAMBERS

[75] Inventor: Kurt-Dieter Herberts, Wuppertal, Fed. Rep. of Germany

[73] Assignee: Herberts Industrieglas GmbH & Co. KG, Wuppertal, Fed. Rep. of Germany

[21] Appl. No.: 422,691

[22] Filed: Oct. 17, 1989

[30] Foreign Application Priority Data

Oct. 27, 1988 [DE] Fed. Rep. of Germany ... 8813504[U]

[51] Int. Cl.⁵ .......................... G02B 5/00; G02B 27/02
[52] U.S. Cl. ................................ 350/319; 250/370.09
[58] Field of Search ...................... 350/319; 52/171; 126/192; 89/33.14, 34; 250/370.09

[56] References Cited

U.S. PATENT DOCUMENTS 1,975,703  10/1934  Vitale ................... 350/319
3,335,607   8/1967  Seekins ................. 350/319

Primary Examiner—Bruce Y. Arnold
Assistant Examiner—Tho Van Tran
Attorney, Agent, or Firm—Pearne, Gordon, McCoy & Granger

[57] ABSTRACT

There is disclosed a viewing window assembly for observing gas-tight and pressure-tight closed chambers of installations from outside comprising a cylindrical frame made of metal, in which is arranged a transparent insert. The frame is made of a stainless steel of low coefficient of thermal expansion and the insert is made of a glass having a similar or still smaller coefficient of thermal expansion.

8 Claims, 1 Drawing Sheet

U.S. Patent
Oct. 9, 1990
4,961,628
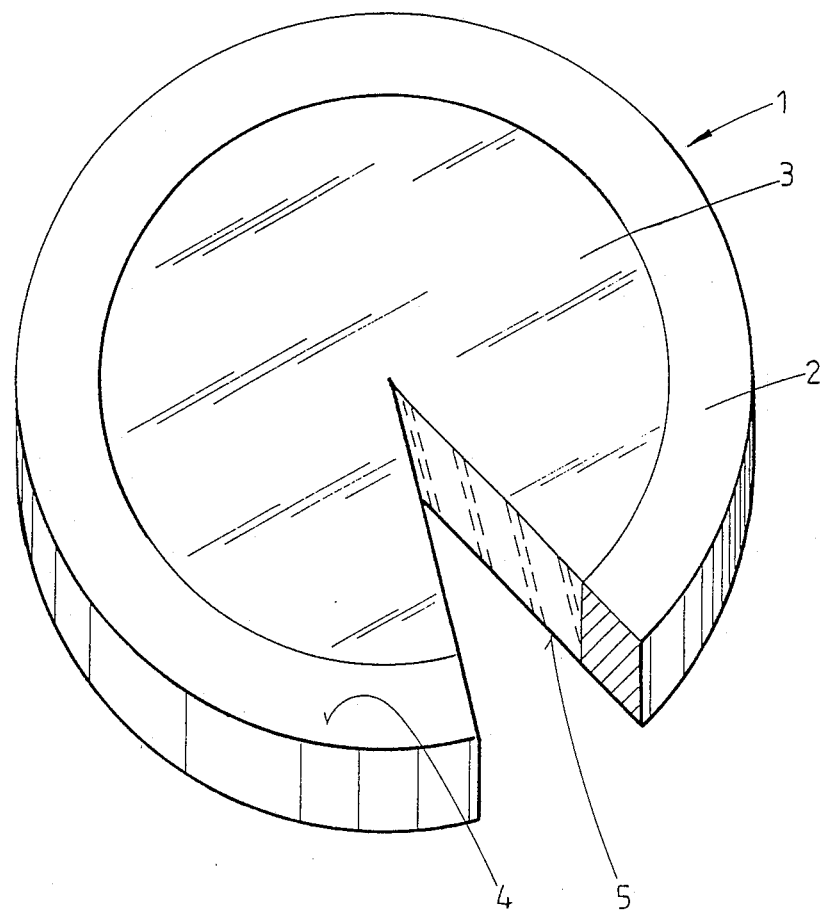

MEANS FOR OBSERVING GAS-TIGHT AND PRESSURE-TIGHT CLOSED CHAMBERS

The invention relates to a device for observing the interior of a gas-tight and pressure-tight closed chamber from outside, comprising a cylindrical frame made of metal and a transparent insert arranged within the frame.

In a known device of this kind for observing encapsulated electric switches, the cylindrical frame is in the form of an insert designed to be screwed into a threaded hole. (DE-GM 82 17 420.2). Accordingly this known device requires special measures in order to enable it to be inserted and removed. The insert can be made of glass which is fused into the frame at one end.

For uses in which high pressure differences between inside and outside are to be withstood, this known device is not suitable. The frame, as it is made of normal stainless steel, has a relatively high coefficient of thermal expansion, which leads to the result that the transparent insert, which is made for example of sodium silicate glass and which itself has a very small coefficient of thermal expansion, can burst at high temperatures and large differential pressures.

On the other hand it is known for example in reactors, to attach viewing glass plates in front of observation openings, mounted detachably between a structure provided on the reactor housing around the observation opening and a clamping ring which can be placed on it and secured by screwing. These known viewing glass plates are always made of glass such as sodium silicate glass which is easily attacked by chemical substances such as caustic soda and also by acids. In order to prevent unacceptably marked bowing or bulging under the action of high pressures such as 10 bar and above, these viewing glass plates are subjected to surface treatment before use in such a way that there is a pre-stress in the surface of the glass, compensating for the deflection which is expected. Such viewing glass plates are accordingly very sensitive to external mechanical actions and easily shatter under impact from or on hard objects. Also in the edge region where such viewing glass plates are clamped, such surface faults can be induced by the clamping pressure itself.

The object of the invention is to provide a device for observing gas-tight and pressure-tight closed chambers which is extremely resistant even under high pressure and thermal influences and under the action of chemical substances, and which can readily be exchanged for the viewing glass plates for example hitherto used in reactors.

This problem is solved by a device of the kind stated in the introduction above, in which the frame is made of a stainless steel of low coefficient of thermal expansion and the insert is made of a glass of the same or a lower coefficient of thermal expansion. Preferably the surfaces of the frame and insert are flush, so as to present a flat cylindrical disc which is smooth right across.

By the invention, there is provide a device for observing gas-tight and pressure-tight closed chambers from outside in which the frame, formed as an annular disc and made of stainless steel, has a thermal contraction and expansion characteristic similar to that of the fused-in glass so that a glass such as boro-silicate glass can be employed, which has both a high resistance to the action of chemical substances such as caustic soda and therefore a high resistance to alkalis, furthermore a resistance to acids and also an ability to withstand the action of steam. On account of the by no means large difference in thermal contraction and expansion characteristics of the stainless steel and of the glass, a reliable bond is achieved between the stainless steel frame and the glass insert, even under extreme operating conditions with regard to temperature and pressure.

Preferably stainless steel of 1.4462 quality is employed for the frame, this having a significantly lower thermal expansion coefficient than ordinary stainless steel. Whereas in the case of ordinary stainless steel the coefficient of expansion is $19 \times 10^{-7}$ mm/mm °C., that of stainless steel of 1.4462 quality is $11 \times 10^{-7}$ mm/mm °C. Stainless steel of 1.4460 quality is also suitable for the device according to the invention.

The boro-silicate glass employed in accordance with the invention has a thermal expansion coefficient of about $5 \times 10^{-7}$ mm/mm °C., which is, it is true, smaller than that of the special stainless steel employed for the frame but the differences between the coefficient of the stainless steel employed for the frame and of the glass employed for the insert is not so large that on large variations of temperature or large rises in temperature in practical use fissures would arise in the glass insert.

The joining together of the frame made of stainless steel and the insert made of glass takes place at a temperature of about 1000 to 1200° C. The glass, inserted in a pourable form into the previously prepared ring-shaped frame is fused at such temperatures that an intimate bond is obtained between the glass and the stainless steel. After cooling of this assembly, the resulting disc-shaped device is ground and subsequently surface-polished by lapping with cerium oxide so as to produce a round disc with uninterrupted smooth surfaces.

The assembly takes place in this way such that the pressure exerted by the ring-shaped frame made of stainless steel on the insert made of glass compensates for tension forces in the glass which are attributable to external pressure influences in use, when the device according to the invention is, for example, built into a viewing or sight opening in a reactor exposed to high pressure.

According to the present invention, therefore, a so-to-say "mechanical" pre-load is produced between the two components of the device, whereas in the case of the known devices of this kind the pre-load holding together the frame and the insert is of a thermal nature so that damage to the compressed surface of the glass insert can lead to fracture of the glass. In the case of the present invention this problem does not arise because the glass of the insert in the device is not under shrink-compression at its surface.

It has been found that the bond between the frame made of stainless steel and the insert made of boro-silicate glass is all the stronger, the tougher and more stable in shape is the material of the frame. On cooling down of the device formed from two components, it is accordingly preferable to regulate the temperature so that the values for the impact strength of the steel are maintained. With this in mind, the steel should, on cooling down, be kept within a temperature range above 600° C. for no longer than twenty minutes.

According to the invention the pressure strength of the viewing device is substantially improved Accordingly the pressures in the interior of a reactor equipped with such a viewing device can lie between 10 and 40 bar and can indeed rise even higher without exhibiting adverse effects or indeed without damaging or destroying the device at all.

An embodiment of the device according to the invention is illustrated by way of example in perspective and partially cut-away in the drawing in a single FIGURE.

As can be seen from the drawing, the device comprises a disc 1 which is circular in plan view and comprises an outer ring 2 of special stainless steel and an inner insert 3 of transparent material, namely boro-silicate glass. The insert 3 is produced by fusing glass in pourable form into the ring 2 and accordingly permanently joined to the ring by fusing integration. Even under the effects of high pressures acting on one side of this disc 1, the insert 3 does not detach itself from the ring 2.

The surfaces 4 and 5 of the disc 1 are ground smooth without interruption and are polished so that the different materials of the ring 2 and of the insert 1 are free from any shoulders or interruptions of the surface.

The device is suitable for the widest possible range of installations such as, for example, apparatus, vessels, pipework and reactors of all kinds.

I claim:

1. In a viewing window assembly for observing the interior of a gas-tight and pressure-tight closed chamber of an installation such as, for example, reactor apparatus, a pressure vessel, or pipework from outside, said assembly comprising a cylindrical frame which is machined out and made of metal, and a transparent insert arranged within said frame, wherein the improvement comprises that said frame is made of a stainless steel of low coefficient of thermal expansion and said insert is made of a glass having a coefficient of thermal expansion which is not greater than that of said frame.

2. The viewing window assembly set forth in claim 1 wherein said frame and said insert together are formed as a disc having a uniform cross-section and having surfaces which are smooth right across.

3. The viewing window assembly set forth in claim 1 wherein said frame is made of ring shape and comprises stainless steel of quality 1.4460 or 1.4462.

4. The viewing window assembly set forth in claim 1 wherein said insert is arranged in said frame and secured therein by fusing integration and is made of boro-silicate glass.

5. The viewing window assembly set forth in claim 4 wherein said insert is arranged in said frame with a mechanical pre-load.

6. The viewing window assembly set forth in claim 2, wherein said frame is made of ring shape and comprises stainless steel of quality 1.4460 to 1.4462.

7. The viewing window assembly set forth in claim 2, wherein said insert is arranged in said frame and secured therein by fusing integration and is made of boro-silicate glass.

8. The viewing window assembly set forth in claim 7, wherein said insert is arranged in said frame with a mechanical pre-load.

* * * * *